No. 809,930. PATENTED JAN. 16, 1906.
JOHN HAYS BIRCH & JOHN HENRY BIRCH.
BOX TRAY FORMING MACHINE.
APPLICATION FILED OCT. 28, 1904.
4 SHEETS—SHEET 1.
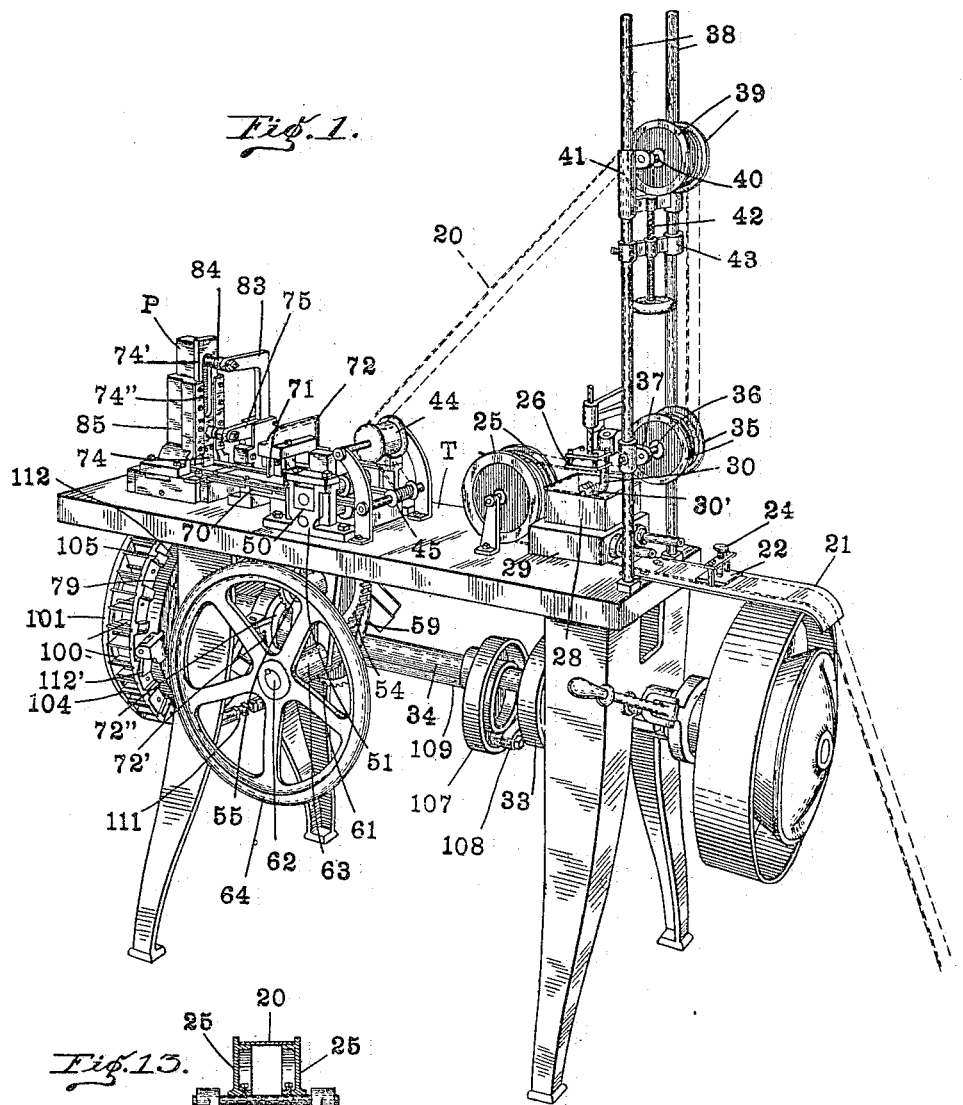
Witnesses
Frank A. Fahle
J. A. Walsh
Inventors
John Hays Birch
John Henry Birch
By Bradford Hood
Attorneys No. 809,930. PATENTED JAN. 16, 1906.
JOHN HAYS BIRCH & JOHN HENRY BIRCH.
BOX TRAY FORMING MACHINE.
APPLICATION FILED OCT. 28, 1904.
4 SHEETS—SHEET 2.
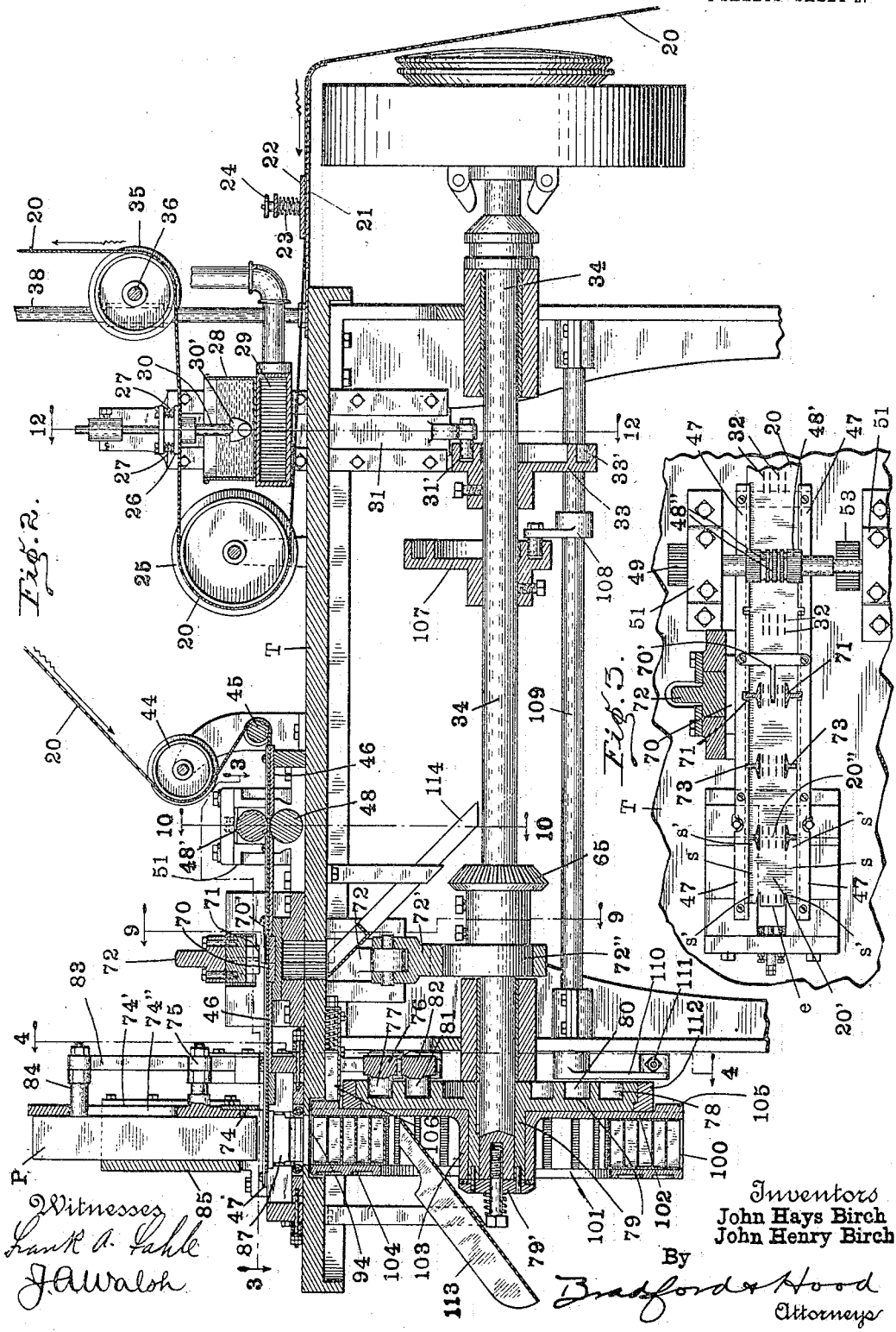

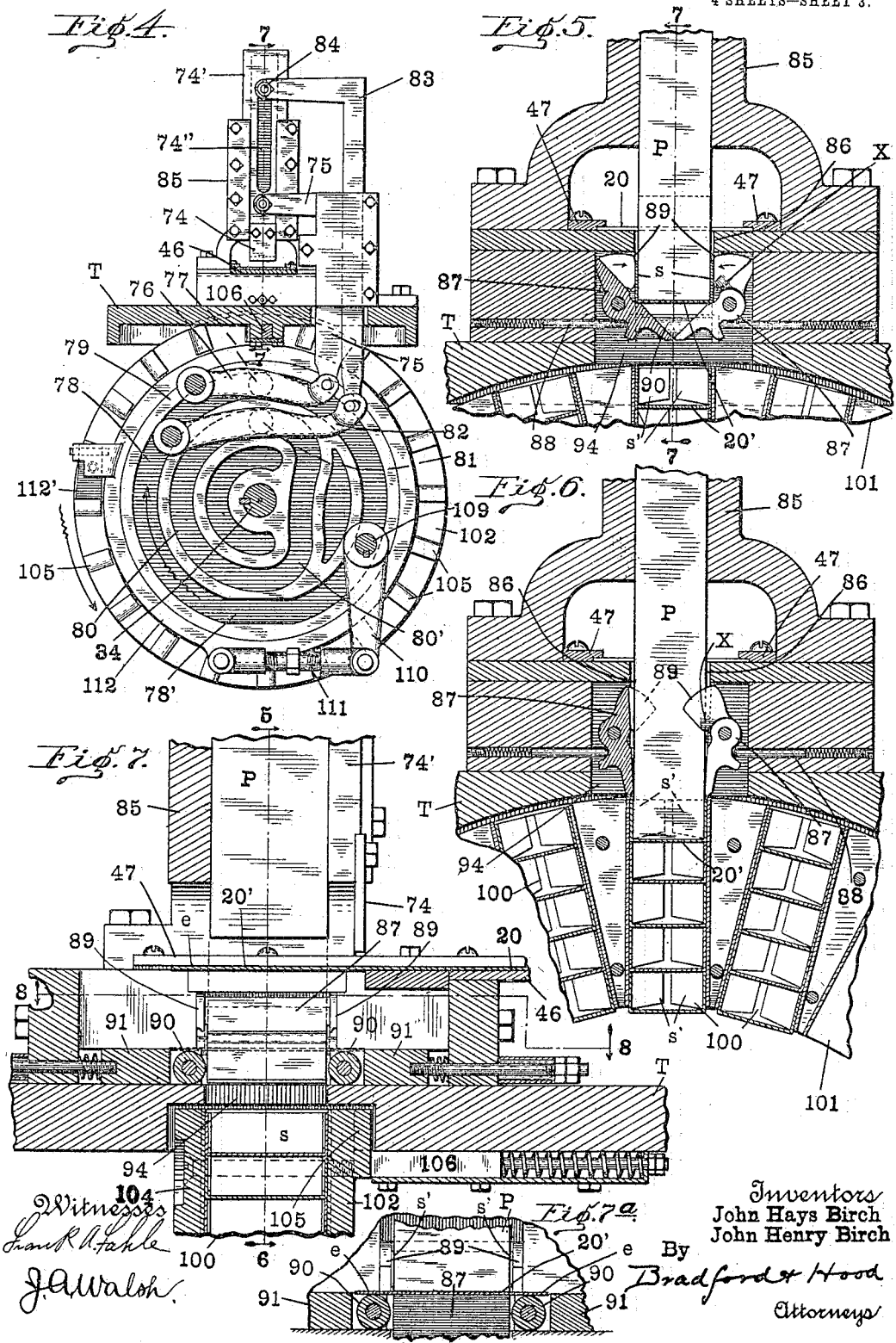

No. 809,930. PATENTED JAN. 16, 1906.
JOHN HAYS BIRCH & JOHN HENRY BIRCH.
BOX TRAY FORMING MACHINE.
APPLICATION FILED OCT. 28, 1904.
4 SHEETS—SHEET 4.
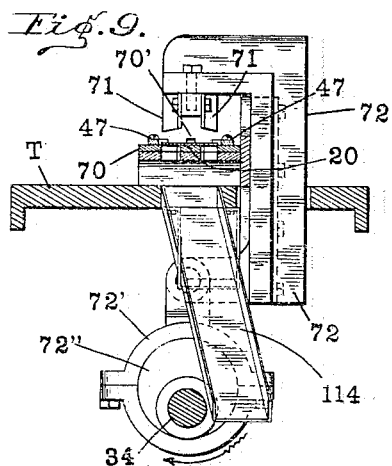
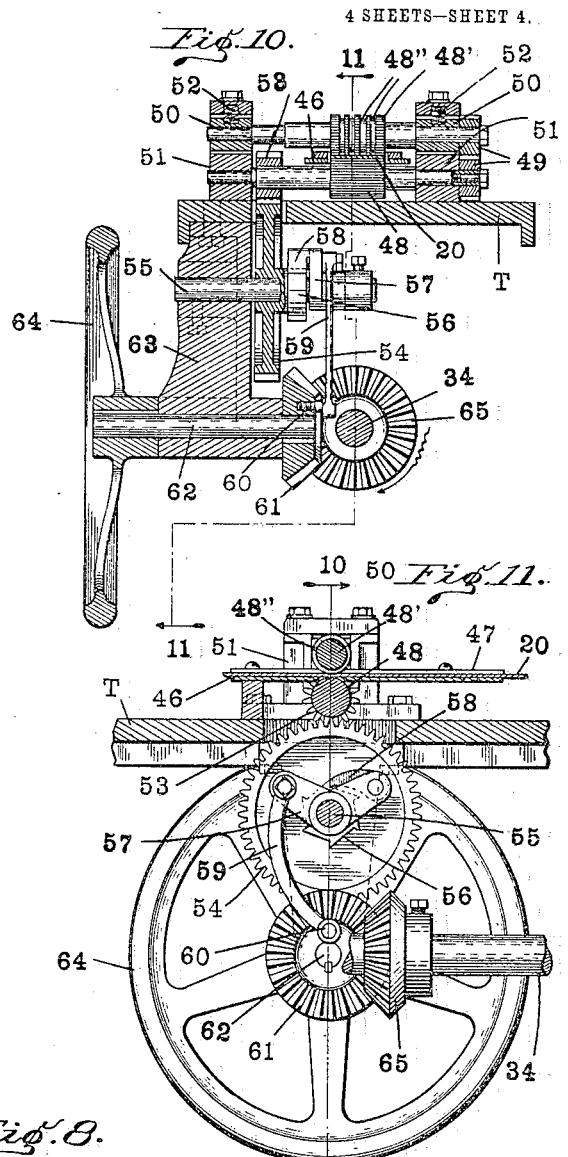
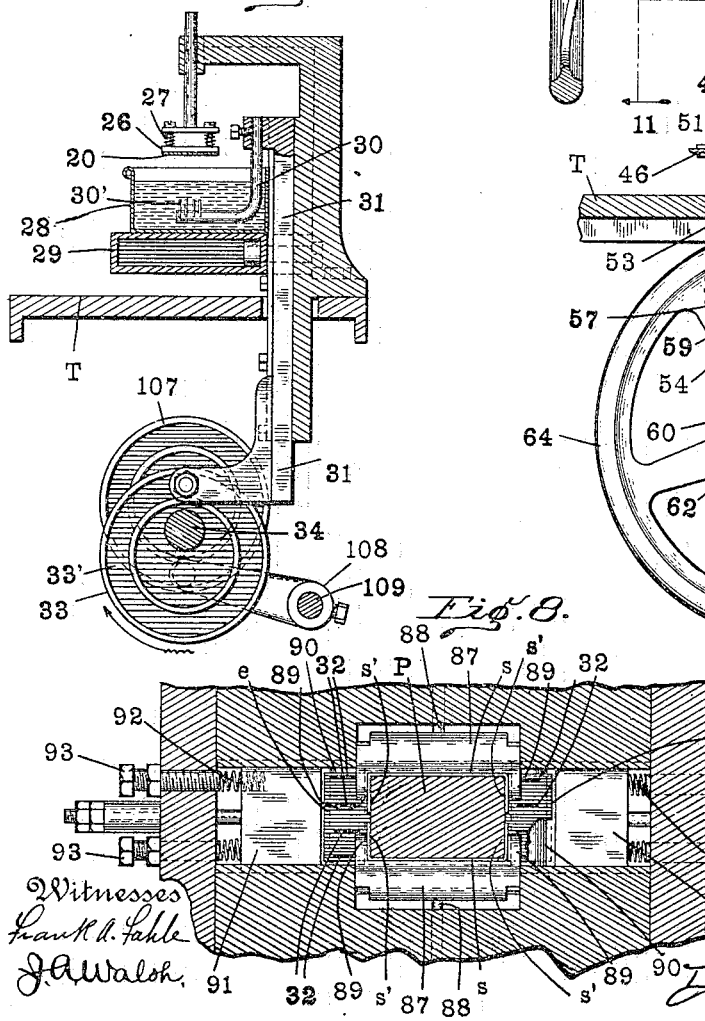

UNITED STATES PATENT OFFICE.

JOHN HAYS BIRCH AND JOHN HENRY BIRCH, OF CRAWFORDSVILLE, INDIANA.

BOX-TRAY-FORMING MACHINE.

No. 809,930.        Specification of Letters Patent.        Patented Jan. 16, 1906.

Application filed October 28, 1904. Serial No. 230,378.

*To all whom it may concern:*

Be it known that we, JOHN HAYS BIRCH and JOHN HENRY BIRCH, citizens of the United States, residing at Crawfordsville, in the county of Montgomery and State of Indiana, have invented certain new and useful Improvements in Box-Tray-Forming Machines, of which the following is a specification.

The object of our invention is to produce a machine capable of automatically making box-trays very rapidly from cardboard or other similar flexible material, the type of said trays being common in match-boxes.

The accompanying drawings illustrate our invention.

Figure 1 is a perspective view of a machine embodying our invention; Fig. 2, a central vertical section of the major portion thereof; Fig. 3, a plan on line 3 3 of Fig. 2; Fig. 4, a vertical section on line 4 4 of Fig. 2; Fig. 5, a vertical section on line 5 6 of Fig. 7, with the plunger partially depressed from the position shown in Fig. 7; Fig. 6, a view similar to Fig. 5, with the plunger carried to its lowest position; Fig. 7, a section on line 7 7 of Fig. 5, with the plunger, however, in its normal or raised position; Fig. 7ª, a detail with the plunger partially advanced; Fig. 8, a section on line 8 8 of Fig. 7, the plunger, however, being in the position shown in dotted lines in Fig. 7. Fig. 9 is a vertical section on line 9 9 of Fig. 2; Fig. 10, a vertical section on line 10 10 of Figs. 2 and 11, the feed-rollers, however, being shown in full lines; Fig. 11, a vertical section on line 11 of Fig. 10; Fig. 12, a section on line 12 12 of Fig. 2, the glue-applying finger and plunger, however, being shown in full lines; and Fig. 13, a detail of the web-guiding flanged wheels.

In the drawings, 20 indicates the strip of cardboard or other material from which the trays are to be formed. This strip is brought from any suitable source of supply over a guide-plate 21 and beneath a tension-plate 22, which coöperates with the guide-plate 21 and is urged toward said plate with a yielding pressure by a spring 23, the tension of said spring being adjustable by means of a nut 24. From thence the cardboard 20 passes over a pair of flanged wheels 25 and back beneath a presser-plate 26, which is normally urged downward by means of springs 27. Arranged beneath the plate 26 is a glue-pot 28, carried by a steam-box 29, the arrangement being such that the glue within the pot 28 may be kept in proper condition. Vertically reciprocable from the glue-pot 28 upward into engagement with the web 20, immediately beneath the plate 26, is a glue-applying plunger 30, provided on its operating-face with a series of teeth 30', capable of applying short marks of glue 32 to the web 20. The plunger 30 is carried by a plunger 31 on one side only of the web and vertically reciprocable in the main frame by means of a pin or roller 31', which projects into the cam-groove 33' of a cam 33, attached to and rotating with the main driving-shaft 34, the arrangement being such that for each revolution of the main driving-shaft 34 the glue-points 30' will be brought once upward and pressed against the web 20 in opposition to the plate 26. This plate 26 being yieldingly mounted insures the proper engagement of the glue-points 30' with the web 20, so that even though the web 20 be buckled or dimpled the points 30' will be sure to properly apply the glue-marks 32. The web 20 passes from beneath plate 26 beneath flanged wheels 35, carried by a shaft 36, mounted in suitable bearings 37, vertically adjustable on a pair of standards 38, and passes from thence upward and over a similar pair of flanged wheels 39, carried by a shaft 40, mounted in a suitable bearing-bracket 41, which is also vertically adjustable on the standards 38. The vertical adjustment of the bracket 41 is accomplished in two ways— first, by means of an adjusting-screw 42, which engages the bracket and is threaded through an arm 43, and, second, by the vertical adjustment of the arm 43 on standards 38. The purpose of this adjustment will be made to appear.

From the wheels 39 the web 20 passes downward and forward over an idler 44 and then backward beneath said idler 44 and around forward beneath a small idler 45 to the main work-table or guide-plate 46, which is provided at its edges with guide-lips 47, which flank the table and beneath which the web 20 is passed. It will be noticed that by the arrangement of idlers the glue is applied to an under side of the web 20, but that this side is finally turned upward, and because of the various turnings of the web it is presented to the main work-table or guide-plate 46 and the lips 47 in such manner as to give its forward end a tendency to spring upward, and thus make it impossible for the forward end of the web to be caught in any of the apertures of the work-table or guide-plate. The idler 45 is provided with peripheral grooves, as indicated in dotted lines in Fig. 2 and full lines in Fig. 1, which aline with the glue-marks 32, so that there will be no smearing of the glue upon this idler.

A short distance in front of the idler 45 are arranged the two feed-rollers 48 and 48', roller 48 being arranged to engage the under side of the web 20 and the roller 48' being arranged to engage the upper side of the web. Both of these rollers are knurled peripherally, and the roller 48' is provided with peripheral grooves 48", which aline with the glue-marks 32. The two feed-rollers 48 and 48' control the movement of the web through the machine, and the shafts of said rollers are therefore geared together by a pair of gears 49. The shaft of roller 48' is supported in bearing-blocks 50, which are capable of a slight vertical movement in the bearing-standards 51, and said bearing-blocks are urged downward by means of suitable springs 52.

In order to drive the feed-rollers 48 and 48', the shaft of roller 48 is provided with a gear 53, which meshes with a gear 54, journaled on a counter-shaft 55. Secured to gear 54 is a ratchet-wheel 56, which is advanced step by step by means of a bell-crank lever 57, sleeved on shaft 55 and provided with a pawl 58, engaging the ratchet-wheel. Lever 57 is rocked by means of a pitman 59, connected to a wrist-pin 60, carried by a gear 61, attached to a counter-shaft 62, journaled in a suitable bracket 63 at right angles to the main drive-shaft 34. The outer end of this shaft 62 is provided with a hand-wheel 64, by means of which the various parts of the machine may be brought to any desired position by manual manipulation. The gear 61 meshes with a gear 65, carried by shaft 34, the arrangement being such that one revolution of shaft 34 will during a part of said revolution cause a sufficient rotation to the two feed-rollers 48 and 48' to advance the web 20 a distance necessary to produce the tray desired.

The webbing or strip 20 is fed forward by the rolls 48 and 48' along the work-table 46 to a die-plate 70, the webbing passing beneath a spring stripper-finger 70', arranged above the die-plate. Plate 70 has formed therethrough a pair of T-shaped openings, one at each edge of the work-table, and these openings are alined with a pair of T-shaped punches 71 71, which overhang the work-table and are carried by a plunger 72, which is on the same side of the web as is plunger 31. At the proper time this plunger is vertically reciprocated by means of an eccentric-strap 72' and an eccentric 72", carried on the main shaft 34, the arrangement being such that the punches engage the strip 20 once for each revolution of the main drive-shaft and cut a pair of T-shaped slots 73 in the edges of the web in alinement with the glue-marks 32, the shanks of these T-shaped cuts extending clear to the edges of the web.

After the web has been cut it is shoved forward along the work-table by repeated movement of the feed-rollers until the middle of the first blank lies immediately beneath a forming-plunger P. When this occurs, a cutter 74 is moved downward by means of a plunger 75, lever 76, pin 77, and the cam-groove 78 of a cam 79, which is carried by the main drive-shaft, the cam-groove 78 having a short portion 78', which causes a quick reciprocation of the cutter 74. This reciprocation of the cutter severs an end 20' (see Figs. 3 and 7ª) from the end of the web, the knife making a cut along the dotted line 20" between a pair of glue-marks 32 and in alinement with the adjacent slots 73. Immediately after the cutter 74 has cut the blank from the web 20 the portion 80' of the cam-groove 80 (of cam 79) is brought into engagement with the pin 81 of lever 82, reciprocating said lever and causing it to reciprocate plunger 83, which plunger is attached by pin 84 to the forming-plunger P. For the sake of compactness the cutter 74 is carried by a head 74', and this head 74' and the plunger P are nested in the same vertical guides 85, and as a consequence the cutter-head 74' is provided with a slot 74", through which the pin 84 projects. Plungers 75 and 83 are both arranged on the same side of the web 20 as plungers 31 and 72. The gluing device, the punches, the cutter, and the forming-plunger thus overhang the web from one side only, and therefore permit free access to all the parts from the other side. This is a decided convenience in the operation of the machine.

As the plunger P descends it engages the blank 20' and forces it down through an opening 86 formed in the work-table 46, and thus bends the side flaps s of the blank 20' up alongside the plunger, the hole 86 being as much wider than the plunger P as twice the thickness of the blank. As shown in the drawings, the opening 86 is formed by the space between two die-blocks. The flaps s of the blank form the sides of the tray and are bent on a line extending between the bases of the L-shaped grooves, which are formed as a result of the severing of the blank from the web 20 on a line along the middle of the opposed T-shaped slots 73. As the plunger P descends farther the blank 20' is brought by it into engagement with a pair of turning-levers 87 which lie normally in the position shown in Fig. 5, immediately beneath the opening 86, and are yieldingly held in this position by spring-pins 88, one of which engages each of said levers. Each of said levers is provided at its upper end with two ears 89, which are adapted to embrace the plunger, the distance between the ears being equal to the width of the plunger plus twice the thickness of the material operated upon. As the plunger continues to descend it engages the lower ends of the arms of the levers 87 and swings them in the direction indicated by the arrows in Fig. 5, thus causing the ears 89 of the two levers to embrace the plunger, and thus fold the tips $s'$ of the side flaps at right angles to the main portion of the flaps, so as to cause these tips $s'$ to also embrace the plunger. The plunger continues to descend until it reaches the point shown in Fig. 7$^a$ and there brings the end flaps $e$ of the blank immediately above the rollers 90. These rollers are each carried by a carriage 91 and are yieldingly urged inward toward the line of the plunger by springs 92, the tension of which may be adjusted by suitable adjusting-screws 93. The plunger P continues to move downward, passing between and beyond the folding-levers 87 and between the rollers 90, so that these rollers cause the end flaps $e$ to turd up alongside of the plunger just outside of the inturned flap-tips $s'$. Each of the end flaps $e$ carries one set of glue-marks 32, and as the plunger passes between the rollers 90 these rollers press the end flaps against the tips $s'$ and cause them to adhere thereto.

Immediately beneath the rollers 90 the main table or bed-plate is provided with an opening 94, which is sufficiently large to permit the plunger, with the formed tray which incloses its lower end, to pass through into one of the radial tray-receiving compartments 100, carried by the drying-wheel 101. The drying-wheel 101 is composed of a main disk-like body 102, the hub 103 of which is sleeved on the hub of cam 79, and this disk-like body 102 is held in frictional contact with one face of cam 79 by means of a spring-pressed collar 79'. Secured to the outer or free face of the body 102 is an annulus 104, and this annulus is separated from the disk 102 by a plurality of nearly radial partitions, which thus form the radial tray-receiving pockets 100, which pockets are of a cross-section equal to the external cross-section of a tray. The rotation of the cam 79 in the direction indicated by the inner arrow in Fig. 4 tends also to rotate the drying-wheel 101 in the same direction. The rear face of the disk 102 is therefore provided with a plurality of teeth 105, adapted to be engaged by the spring plunger-lock 106, the arrangement being such that when one of the teeth 105 is held against the lock 106 by the rotation of the cam 79 in the direction indicated by the arrow one of the tray-pockets 100 will be in correct alinement with the plunger P, and, as a consequence, when the plunger P has performed its downward movement, as indicated in Fig. 6, it will have forced the freshly-formed tray into the upper end of the alined pocket 100 of the drying-wheel 101. As soon as this downward movement of the plunger P is accomplished it is automatically returned upward, and the lower ends of the folding-levers 87, as indicated clearly in Fig. 6, serve as strippers to prevent the freshly-formed tray from rising with the plunger and to thus hold said freshly-formed tray in the drying-wheel.

As soon as the plunger P has been withdrawn from the drying-wheel the cam 107, which is carried by the driving-shaft 34, operates upon a lever 108, carried by a rock-shaft 109, to swing a lever 110, which lever is connected by link 111 to a pawl-ring 112, journaled upon the periphery of cam 79, and this causes the pawl 112' of the pawl-ring 112 to engage one of the teeth 105 and throw the driving-wheel in the direction indicated by the outer arrow in Fig. 4 a distance sufficient to cause an advancement of the drying-wheel through an angular distance a trifle more than enough to bring a new compartment 100 into alinement with the plunger P. As soon, however, as the pawl 112' is moved backward on its return stroke the drying-wheel, by reason of the friction with cam 79, is moved back so as to bring the new tooth 105 into contact with a lock-plunger 106, and thus accurately aline the new tray-compartment with the plunger P. In the meantime the feed-rollers have been moved to cause another advancement of the web 20, and the several operations already described are repeated.

The tray-compartments 100 are of a radial length sufficient to hold several trays—five in the present instance—so that the trays are held within the drying-wheel a sufficient length of time to allow the glue to set. As each compartment 100 becomes filled a new and freshly-formed tray will be pushed into the compartment above the trays already therein and will shove the innermost tray out from the compartment and it will drop into a discharge-chute 113.

The cuttings from the T-shaped punches 71 are forced through the die member 70 and dropped into a discharge-chute 114.

It will be readily seen that the length of web between the plunger P and the glue-applying points 30' must be very accurate in order that the box-forming blank may be cut at the proper places. This distance is accurately adjusted by means of the adjusting-screws 42.

Under varying conditions of weather we find it necessary to give the glue more or less time to properly partially set before the tray is formed, and in order to permit a sufficient adjustment for this purpose the cross-arm 43 is made adjustable on the standards 38, a very considerable difference in effective distance between the glue-applying teeth 30' and the knife 74 being thus made possible.

It will be seen that the machine as thus constructed is provided with but one driving-shaft, from which all of the moving parts are controlled by simple mechanical connections and that all of the movements are positive. It is also apparent that all of the parts are very easily accessible for inspection, adjustment, and repair. The tray is formed entirely automatically during a continuous downward movement of a single plunger. There are no periods of rest necessary for the folding of the end tips and flaps.

In order to prevent the outer faces of the lips 89 of the folding-levers 87 from becoming smeared with the end glue marks 32, (which are in alinement with these lips, as is clearly illustrated in Fig. 8,) the lips are slightly undercut, as indicated by shade lines at X in Figs. 6 and 7, so that as the end flaps $e$ are turned upward by the downward movement of the plunger between the rollers 90 these glue-marks will aline with the undercut portions X and will not, therefore, contact with the ears 89.

The machine described may be operated very rapidly, continuously, and noiselessly because of the positive action of all the parts.

It will be readily understood that scoring means to facilitate the folding operation may be added without departing from our invention.

We claim as our invention—

1. In a tray-forming machine, the combination, with a tray-forming plunger and means for reciprocating the same, of a work-table having an aperture therethrough one dimension of which is slightly greater than the plunger, a pair of bending-levers arranged beyond the aperture and each provided with means for engaging the ends of the flaps upturned by passage through the aperture to bend said ends around the plunger, means for actuating said bending-levers, a pair of spring-pressed rollers arranged beyond the folding-levers and at right angles thereto upon opposite sides of the path of movement of the forming-plunger, a drying-wheel provided with a plurality of tray-receiving pockets, and means for bringing said tray-receiving pockets into successive alinement with the forming-plunger.

2. In a tray-forming machine, the combination, with a tray-forming plunger and means for reciprocating the same, of a work-table having an aperture therethrough one dimension of which is slightly greater than the plunger, a pair of bending-levers arranged beyond the aperture and each provided with means for engaging the ends of the flaps upturned by passage through the aperture to bend said ends around the plunger, each of said bending-levers being provided with a portion arranged to be engaged by the plunger during its forming movement to throw said bending-levers, a pair of spring-pressed rollers arranged beyond the folding-levers and at right angles thereto upon opposite sides of the path of movement of the forming-plunger, a drying-wheel provided with a plurality of tray-receiving pockets, and means for bringing said tray-receiving pockets into successive alinement with the forming-plunger.

3. In a tray-forming machine, the combination with a driving-shaft rotating in one direction and a tray-forming mechanism operated thereby, of a drying-wheel journaled on said shaft and provided with a plurality of tray-receiving pockets, said shaft tending to rotate the drying-wheel in the direction of its rotation, a catch for preventing rotation of the drying-wheel in that direction, and means for intermittently moving said drying-wheel angularly in the direction opposite to the rotation of the driving-shaft.

4. In a machine of the class described, the combination with a work-table, means for cutting material into desired blanks, means for forming said material, means for feeding the material to the work-table, and means for applying glue to the blanks, of a series of idlers over which the material is bent first in one direction and then in the other, the last of said idlers being arranged in conjunction with the work-table on the work side thereof whereby the final bend of the material gives it a tendency to move away from the work-surface of the table.

In witness whereof we have hereunto set our hands and seals, at Crawfordsville, Indiana, this 24th day of October, A. D. 1904.

JOHN HAYS BIRCH. [L. S.]
JOHN HENRY BIRCH. [L. S.]

Witnesses:
　MARY C. PITMAN,
　WILLIAM T WHITTINGTON.